United States Patent
Müller et al.

(10) Patent No.: US 7,155,798 B2
(45) Date of Patent: Jan. 2, 2007

(54) METHOD FOR THE ATTACHMENT OF A FUNCTIONAL ELEMENT TO A SHEET METAL PART AND ALSO A COMPONENT ASSEMBLY

(75) Inventors: Rudolf Müller, Frankfurt am Main (DE); Jiri Babej, Lich (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 90 days.

(21) Appl. No.: 10/896,459

(22) Filed: Jul. 22, 2004

(65) Prior Publication Data

US 2005/0022359 A1 Feb. 3, 2005

(30) Foreign Application Priority Data

Jul. 25, 2003 (DE) ............... 103 34 121
Jun. 29, 2004 (DE) ............ 10 2004 031 379

(51) Int. Cl.
*B23P 11/00* (2006.01)
*F16B 37/00* (2006.01)

(52) U.S. Cl. ............ 29/512; 29/524.1; 29/525.06; 29/525.11; 29/525.13; 403/282; 403/285

(58) Field of Classification Search ............ 29/512, 29/522.1, 524.1, 525.02, 525.06, 525.11, 29/525.13; 411/103, 105, 106, 107, 111, 411/113, 116, 166, 176, 177, 179, 181, 183, 411/386; 403/281, 282, 283, 285, 22, 277, 403/279

See application file for complete search history.

(56) References Cited

U.S. PATENT DOCUMENTS

| | | | | |
|---|---|---|---|---|
| 1,360,815 A | * | 11/1920 | Suttill ............ | 285/202 |
| 1,705,463 A | * | 3/1929 | Andren ............ | 411/180 |
| RE17,907 E | * | 12/1930 | Andren ............ | 411/180 |
| 1,872,385 A | * | 8/1932 | Andren ............ | 411/180 |
| 1,872,616 A | * | 8/1932 | Andren ............ | 411/183 |
| 1,883,906 A | * | 10/1932 | Hasselquist ...... | 29/512 |
| 2,075,675 A | * | 3/1937 | Camiel ............ | 411/183 |
| 2,127,696 A | * | 8/1938 | Mitchel ........... | 411/177 |

(Continued)

FOREIGN PATENT DOCUMENTS

EP        0 539 793 B1     5/1993

(Continued)

*Primary Examiner*—Essama Omgba
(74) *Attorney, Agent, or Firm*—Hunton & Williams LLP; Eugene C. Rzucidlo

(57) ABSTRACT

A method for the attachment of a functional element, for example in the form of an RSN or RND element of the company Profil Verbindungstechnik GmbH & Co. KG, is described in which the hole in the sheet metal part is so formed that the sheet metal part lies in one plane in the region confronting the end face of the riveting die button and at least substantially does not project beyond this plane. The hole in the sheet metal part has an inner diameter which is larger than the outer diameter of the rivet section of the element, ignoring any features present there providing security against rotation, by an amount which ensures that the marginal region of the hole is deformed by the action of the riveting die button out of the sheet metal plane and in the direction of the body section of the functional element before the marginal region of the hole enters into contact with the riveting section as a result of the formation of the rivet bead, so that neither a bending of the marginal region of the hole out of the sheet metal plane nor the formation of the rivet bead is prevented.

21 Claims, 8 Drawing Sheets

U.S. PATENT DOCUMENTS

| | | | | |
|---|---|---|---|---|
| 2,170,472 A | * | 8/1939 | Fitch | 29/509 |
| 2,415,695 A | * | 2/1947 | Cann | 411/180 |
| 2,726,559 A | * | 12/1955 | Di Giulio | 408/72 B |
| 3,014,609 A | * | 12/1961 | Hobbs | 29/509 |
| 3,053,300 A | * | 9/1962 | Quinto | 411/180 |
| 4,713,872 A | * | 12/1987 | Muller | 29/512 |
| 5,251,370 A | | 10/1993 | Muller et al. | |
| 5,335,411 A | * | 8/1994 | Muller et al. | 29/512 |
| 5,868,535 A | * | 2/1999 | Ladouceur | 411/181 |
| 6,122,816 A | * | 9/2000 | Ladouceur | 29/509 |
| RE38,061 E | * | 4/2003 | Ladouceur | 29/509 |

FOREIGN PATENT DOCUMENTS

| | | |
|---|---|---|
| EP | 1 116 891 B1 | 7/2001 |

* cited by examiner

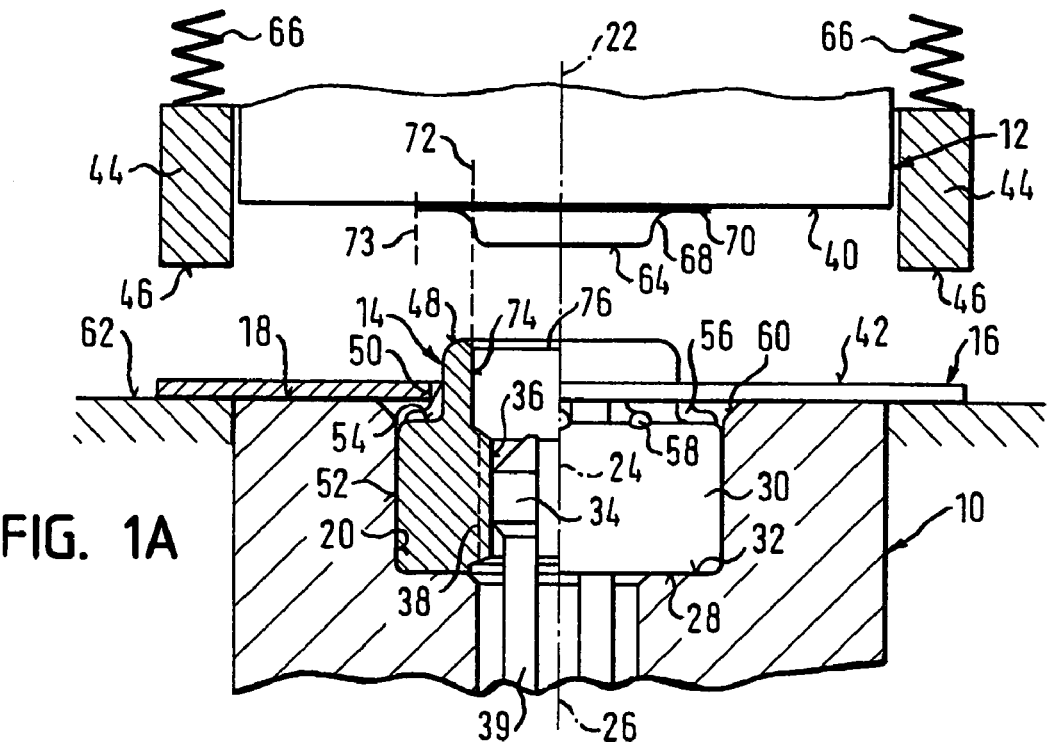
FIG. 1A
FIG. 1B
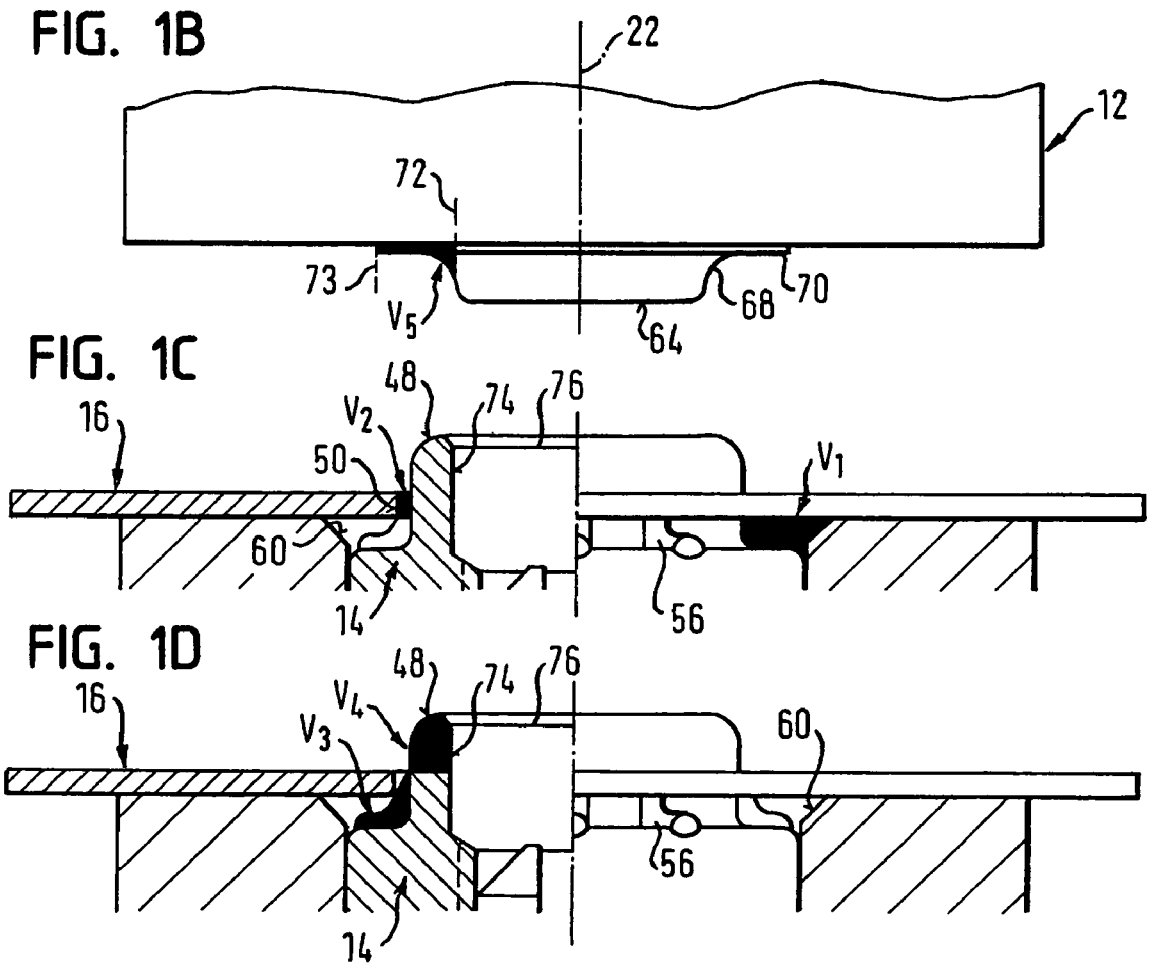
FIG. 1C
FIG. 1D

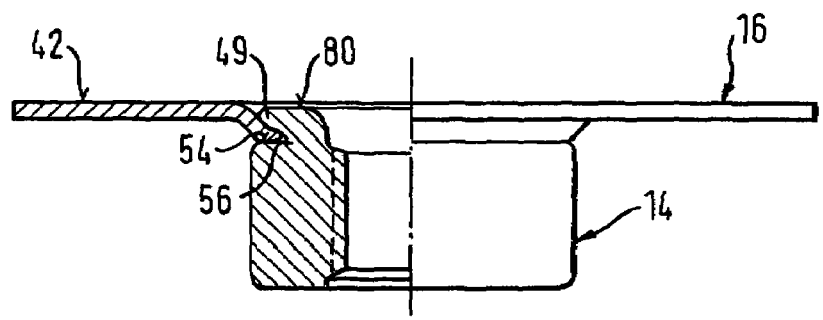
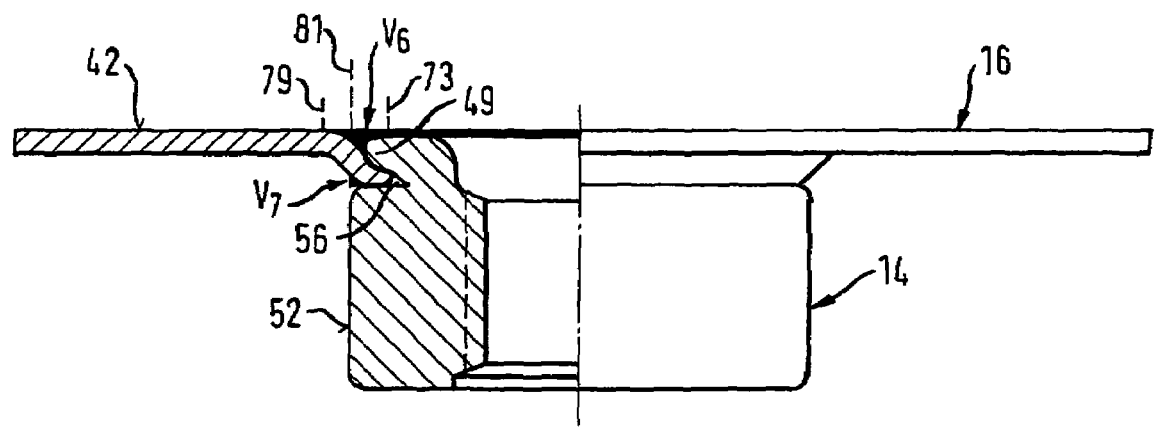

METHOD FOR THE ATTACHMENT OF A FUNCTIONAL ELEMENT TO A SHEET METAL PART AND ALSO A COMPONENT ASSEMBLY

CROSS REFERENCE TO RELATED APPLICATIONS

This application claims the benefit under 35 U.S.C. § 119 of the Jun. 29, 2004 filing date of German application number 10 2004 031 379.2 and the Jul. 25, 2003 filing date of German application number 103 34 121.8.

FIELD OF INVENTION

The present invention relates to a method for the attachment of a functional element, in particular of a fastener element, to a sheet metal part, wherein the functional element has an at least substantially non-deformable body section of larger diameter which merges via a ring-like contact surface into a deformable tubular rivet section of smaller diameter and also preferably has rib-like features providing security against rotation which are present in raised form in the region of the contact surface and/or at the outer side of the rivet section, wherein the sheet metal part is pre-holed to receive the rivet section and, after the introduction of the rivet section into the preferably right cylindrical hole the rivet section is reshaped radially outwardly to form a rivet bead by means of a riveting die button having a raised portion at its end face confronting the sheet metal part.

BACKGROUND OF THE INVENTION

A method of the above named kind is described in U.S. Pat. No. 5,251,370 and in the corresponding EP-B-539 793.

The corresponding method is used with a functional element in which the body section or its jacket surface merges via a ring-like contact surface disposed in a plane perpendicular to the longitudinal axis of the functional element into the tubular rivet section, with ribs providing security against rotation being provided in raised form at the contact surface and at the tubular rivet section and preferably having a somewhat right-angled shape. A functional element of this kind is obtainable from the company Profil Verbindungstechnik GmbH & Co. KG under the designation RSN.

The same method can however also be used with a functional element in which the body section or its jacket surface merges via a ring-like contact surface arranged in a plane perpendicular to the longitudinal axis of the functional element into an axial ring-like groove which is bounded at the radially inner side by the tubular rivet section, with the radial groove having a conical wall adjacent to the ring-like contact surface and being bridged by radially extending ribs providing security against rotation. A functional element of this kind is obtainable from the company Profil Verbindungstechnik GmbH & Co. KG under the designation RND. Other elements in which the body section merges via a ring-like contact surface disposed in a plane to the longitudinal axis of the functional element directly or indirectly into the rivet section can be secured to a sheet metal part with the named method.

Whereas the RSN element is shown in the said EP-B-539 793 the RND element is claimed in the European patent application 01 109 757.3.

Both elements, i.e. the both RSN element and also the RND element will be secured to a sheet metal part using the so-called clamping hole riveting method in accordance with EP 539 793 B1.

This method is carried out in such a way that a hole extending through the sheet metal part is formed, in that the sheet metal part is drawn and plastically deformed into a generally dome-like section which surrounds the hole, with the hole being disposed at a smaller diameter of the dome-like section, the tubular section of the functional element is inserted through the hole into the sheet metal part and the dome-like section of the panel is plastically deformed, whereby the diameter of the hole is reduced and the surrounding material is brought into engagement with the tubular rivet section. At the same time as the pressing flat of the dome-like section of the sheet metal part into a generally planar shape an end of the tubular rivet section is simultaneously plastically deformed radially outwardly, whereby a mechanical interlock is formed between the sheet metal part and the functional element. In other words, the diameter of the hole in the sheet metal part is reduced and at the same time the tubular rivet section with the functional element is dilated radially outwardly as a result of the action of the riveting die button, so that a firm pressure of the sheet metal part against the tubular rivet section takes place.

The hole is dimensioned so that, if the sheet metal part is pressed flat without an element inserted therein, the inner diameter of the hole is smaller than the outer diameter of the tubular rivet section. This dimensioning of the hole ensures that the desired "strangling action" between the sheet metal part and the tubular rivet section takes place. In this way a permanent compressive stress is to be produced both in the sheet metal material around the edge of the hole and also in the tubular rivet section and in the installed state. This compressive stress leads to a high contact force, and thus friction, at the hole between the sheet metal part and the tubular rivet section, whereby a considerable security against rotation is achieved between the functional element and the sheet metal part independently of the noses providing security against rotation. Furthermore, this permanent compressive stress provides a security against fatigue cracks because these can only arise if the compressive stress changes as a result of loading into a tensile stress. As a result of the compressive stress such tensile stresses and thus fatigue cracks can be effectively prevented.

It is not necessary for the sheet metal part to be first deformed into a dome-like section and then to produce the hole in the dome-like section but rather the hole can be produced first and then the sheet metal part can be deformed into a dome-like section, or the formation of the dome-like section and of the hole can take place simultaneously.

It can be seen from the above quoted description of the known method that the dome-like section is essential in order to ensure that on pressing flat or partial pressing flat of the dome-like section a reduction in size of the hole is achieved. Furthermore it can be seen from the description that the hole is to have a diameter which is only fractionally larger than the diameter of the tubular section. In practice the hole in the dome-like section has a diameter prior to the attachment of the functional element which exceeds the diameter of the tubular section by about 0.3 mm.

BRIEF SUMMARY OF THE INVENTION

The object of the present invention is to provide a different method of attaching a functional element of the initially named kind, i.e. for example an RSN element or an RND element, to a sheet metal part in which, on the one hand, the sheet metal preparation is simplified and on the other hand, however, a high strength connection is achieved between the functional element and the sheet metal part.

This object is satisfied in accordance with the invention in that the hole in the sheet metal part is so formed that the sheet metal part lies in one plane in the region confronting the end face of the riveting die button and at least substantially does not project beyond this plane, in that the hole in the sheet metal part has an inner diameter which is larger than the outer diameter of the riveting section, ignoring any features present there providing security against rotation, by an amount which ensures that the marginal region of the hole is deformed by the action of the riveting die button out of the sheet metal plane and in the direction of the body section of the functional element before the rim region of the hole enters into contact with the riveting section as a result of the formation of the rivet bead, so that neither a bending of the marginal region of the hole out of the sheet metal plane nor the formation of the rivet bead is prevented, and in that the functional element is received in sunk-form in a recess of a setting head, so that the contact surface of the functional element which stands furthest to the fore does not project at least substantially beyond the free end face of the setting head confronting the sheet metal part which defines the entrance to the recess and is as a rule set back from this end face.

The hole in the sheet metal part is preferably executed as a smooth pierced hole and the amount, by which the inner diameter of the hole exceeds the outer diameter of the rivet section preferably lies in the range from 0.8 mm to 1.2 mm and preferably at 1.0 mm. It is best of all, when, for functional elements of the size below M6 the said amount is selected in the range of 0.8 mm, in the size M8 is selected at about 1.0 mm and for the size M10 or greater is selected to be about 1.2 mm, independently of the sheet metal thickness.

Since the sheet metal part is not deformed into a dome-like section but is rather simply pierced in the plane of the sheet metal part the sheet metal processing is simplified. It is surprising, that despite the avoidance of a dome-like section which would, on being pressed flat, lead to a reduction of the hole diameter, the hole is selected in accordance with the present invention to be significantly larger than in the previous clamping or riveting process (approximately 1.0 mm instead of 0.3 mm) but that the desired high strength connection is nevertheless achieved.

Through the measure of invention of providing the hole in the sheet metal part with an inner diameter which is larger than the outer diameter of the riveting section, ignoring any features providing security against rotation which may be provided there, it is ensured that the edge region of the hole is bent under the action of a riveting die button out of the plane of the sheet metal and in the direction towards the body section of the functional element before the edge region of the hole enters into contact with the rivet section as a result of the formation of the rivet bead. If the hole were to exceed the outer diameter of the tubular rivet section by only 0.3 mm, as in the clamping hole riveting process, such a contact would arise if the sheet metal part were to lie in one plane. Through this contact the orderly formation of the riveting bead would be prevented and the attachment method would no longer be satisfactorily carried out. Since, when carrying out the method of the invention, the sheet metal part only enters into contact in the area of the rim of the hole with a rivet bead that has already received an oblique position with respect to the rim of the hole, as a result of the radial dilation of the tubular rivet section, the sheet metal part is deformed conically in the region of the edge of the hole as a result of the inclined position of the rivet bead which is now diverging conically in the direction towards its free end, i.e. a dome-like section quasi arises automatically in the region of the hole edge, the rivet bead can then no longer be hindered from undergoing the desired deformation to form the desired rivet bead and one succeeds, by selecting the degree of recessing of the functional element in the recess of the setting head, in producing a component assembly consisting of the functional element and the sheet metal part, with the functional element having a high strength bond to the sheet metal part.

The degree of recessing of the functional element in the recess of the setting head must be selected in accordance with the thickness of the sheet metal part in order to achieve the desired high quality strong bond of the functional element to the sheet metal part.

It is particularly favourable when the end face of the setting head has a chamfer or a rounded transition, or a convexly rounded transition around the functional element in the region of the transition of the recess into this end face.

This chamfer or this transition ensures that the functional element can be secured in accordance with the respective thickness of the sheet metal part to the sheet metal part in an orderly manner.

Particulars relating to the design of the recess and of the hole in the sheet metal part taking account of the thickness of the sheet metal part and also on the design of a functional element can be seen from the further patent claims as can particulars relating to the specific design of the preferred die button and preferred arrangements of the setting head. Finally the component assembly of the invention, consisting of the sheet metal part and a functional element riveted to the sheet metal part by means of the above recited method, is also claimed.

BRIEF DESCRIPTION OF THE SEVERAL VIEWS OF THE DRAWING

The present invention will be explained in more detail in the following with reference to examples and to the drawing in which are shown:

FIG. 1A a schematic, partly axially sectioned representation of an apparatus for the attachment of a functional element of the type RSN of the company Profil Verbindungstechnik GmbH & Co. KG to a thin sheet metal part, FIG. 1B an enlarged representation of the die button of FIG. 1A to illustrate the volume $V_5$, FIG. 1C an enlarged representation of the setting head of FIG. 1A to illustrate the volumes $V_1$ and $V_2$, and FIG. 1D an enlarged representation of the setting head of FIG. 1A to illustrate the volumes $V_3$ and $V_4$.

FIG. 2A a representation of the RSN element of FIG. 1A after the attachment to the sheet metal part, FIG. 2B an enlarged representation of FIG. 2A in order to show the volumes V6 and V7, FIG. 3A the same functional element as in the FIG. 1A, this time in an apparatus for the attachment of the functional element to a thicker sheet metal part, FIG. 3B the die button of FIG. 3A in order to illustrate the volume V5, FIG. 3C the setting head of FIG. 3A in order to illustrate the volumes V1 and V2, FIG. 3D the setting head of FIG. 3A in order to show the volumes $V_3$ and $V_4$, FIG. 4A the same functional element as in FIG. 3A, but after attachment to the sheet metal part, FIG. 4B the same representation as FIG. 3A but to a larger scale in order to show the volumes V6 and V7, FIG. 5A an apparatus consisting of a setting head and a die button for the attachment of a functional element in the form of an RND element of the company Profil Verbindungstechnik GmbH & Co. KG to a thin sheet metal part, FIG. 5B a representation of the die button of FIG. 5A to an enlarged scale to illustrate the volume $V_5$, FIG. 5C a representation of the setting head of FIG. 5A to an enlarged scale to illustrate the volumes V1 and V2, and FIG. 5D a representation of the setting head of FIG. 5A to an enlarged scale to illustrate the volumes V3 and V4, FIG. 6A the functional element of FIG. 6A after attachment to the sheet metal part, FIG. 6B the same representation as FIG. 6A but to a larger scale in order to additionally show the volumes V6 and V7, FIG. 7A an apparatus consisting of a setting head and a die button for the attachment of an RND element of the company Profil Verbindungstechnik GmbH & Co. KG to a thick sheet metal part, FIG. 7B the die button of FIG. 7A to an enlarged scale in order to illustrate the volume V5, FIG. 7C a representation of the setting head according to FIG. 7A to an enlarged scale to illustrate the volumes $V_1$ and $V_2$, FIG. 7D a representation of the die button of FIG. 7A an enlarged scale in order to illustrate the volumes V3 and V4, FIG. 8A the functional element of FIG. 7 after attachment to the sheet metal part, and FIG. 8B the same representation as FIG. 8A, but to an enlarged scale, in order to illustrate the volumes $V_6$ and $V_7$.

DETAILED DESCRIPTION OF THE INVENTION

Figure 3A:
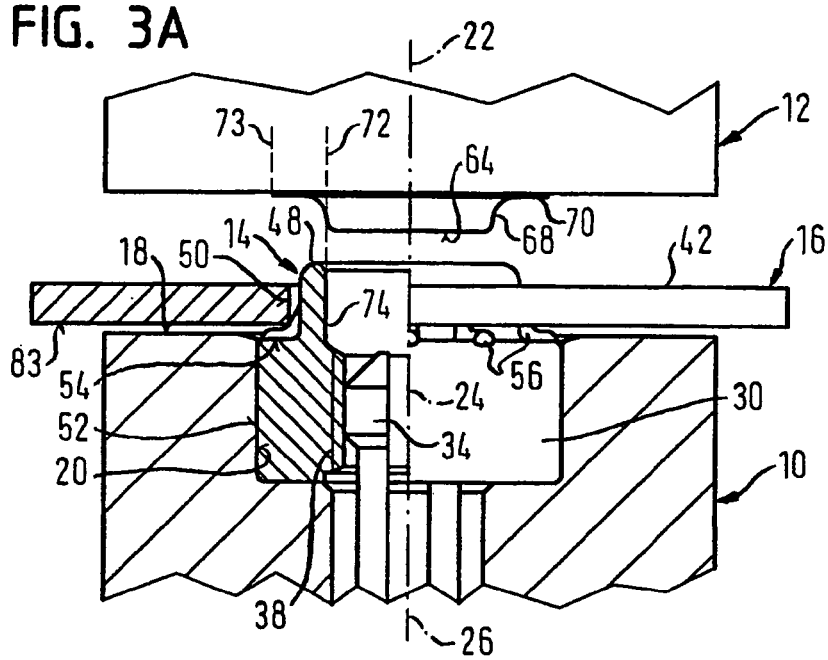

Referring to FIG. 1A this drawing shows a setting head 10 and also a die button 12 which are designed for the attachment of a functional element 14 to a sheet metal part 16.

In this representation the setting head 10 is arranged at the bottom whereas the die button 12 is located above the setting head. In the normal manner the die button 12 is attached to an intermediate platen or to an upper tool of a press whereas the setting head 10 is arranged in the lower tool of the press or in the intermediate platen respectively. This arrangement is preferred because one can ensure in this way, in a simple manner, that the sheet metal part 16 sits fully on the end face 18 of the setting head and over the projecting part of the functional element 14 before the die button 12 starts with the deformation of the functional element 14 and of the sheet metal part 16. This arrangement is however not absolutely essential, the arrangement could entirely be such that the setting head 10 is arranged on the intermediate platen or on the upper tool of a press, whereas the die button 12 is arranged in the lower tool of the press or in the intermediate platen respectively. Measures must then be taken to ensure that the functional element 14 is fully located within the recess 20 of the setting head and that the sheet metal part 16 is fully in contact with the end face 18 of the setting head 10.

Furthermore, it is not absolutely essential to use the setting head and the die button 12 in a press. Instead of this the die button 12 and the setting head 10 could for example be carried by a robot and could be moved towards one another and away from one another by means of the robot in accordance with the movement in a press. The robot could for example be realized as a C-frame, with the die button being arranged at one end of the C adjacent to the mouth of the C-frame whereas the setting head is arranged at the other end of the C adjacent to the mouth of the C-frame and aligned with the die button. In all cases the aligmnent should be such that the central longitudinal axis 22 of the die button is aligned with the central longitudinal axis 24 of the setting head 10 and with the central longitudinal axis 24 of the functional element 14.

Figure 7A:
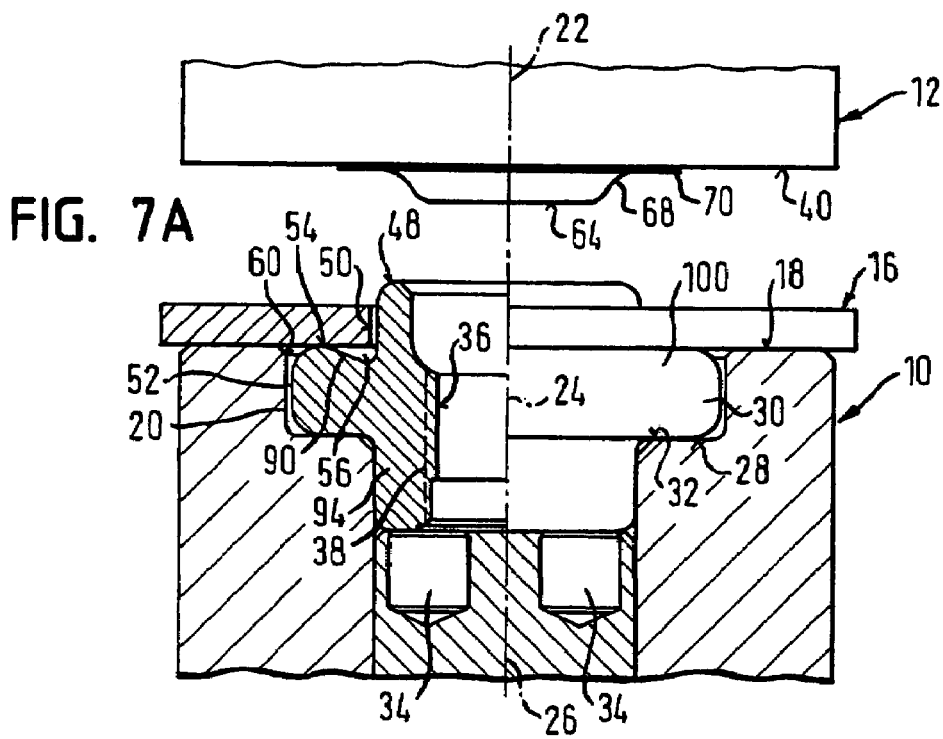
Figure 7B:
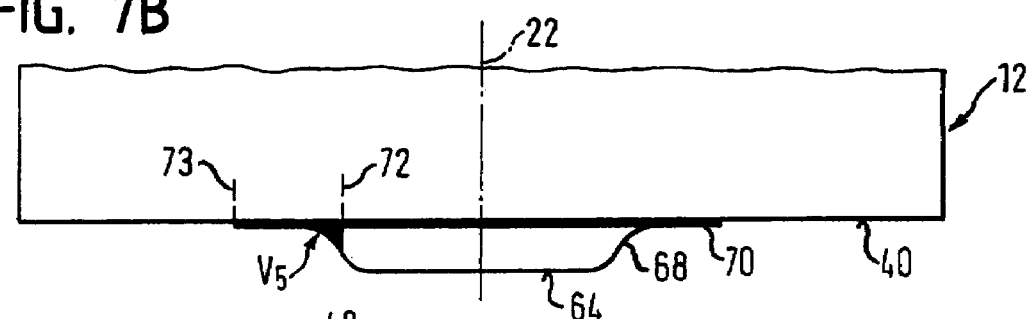
Figure 7C:
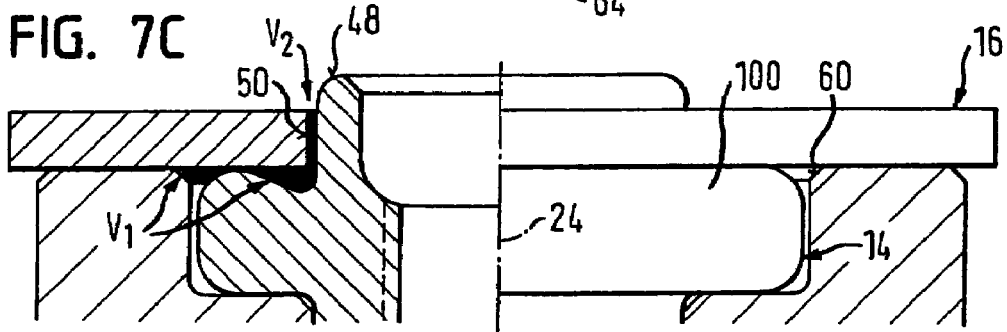
Figure 7D:
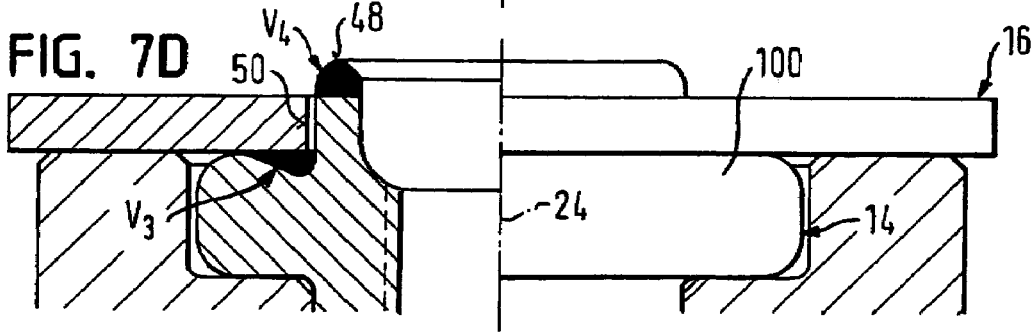
Figure 8A:
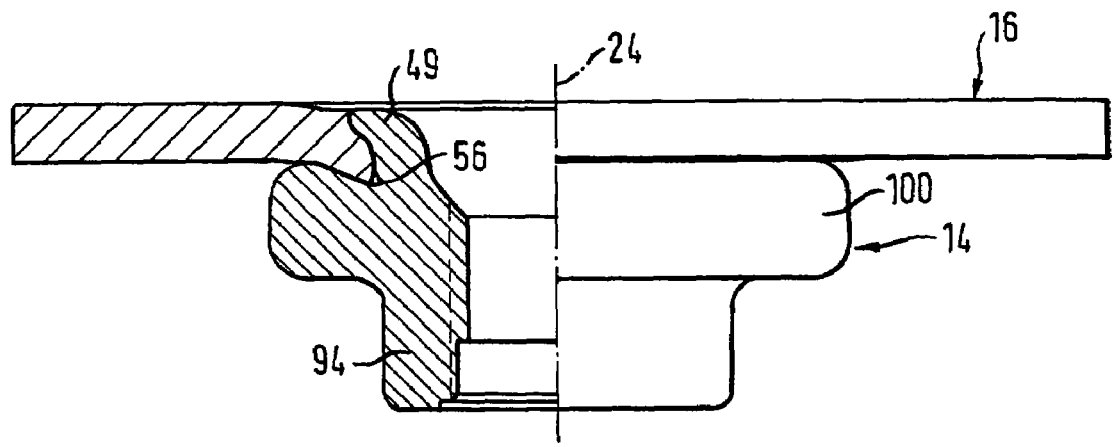
Figure 8B:
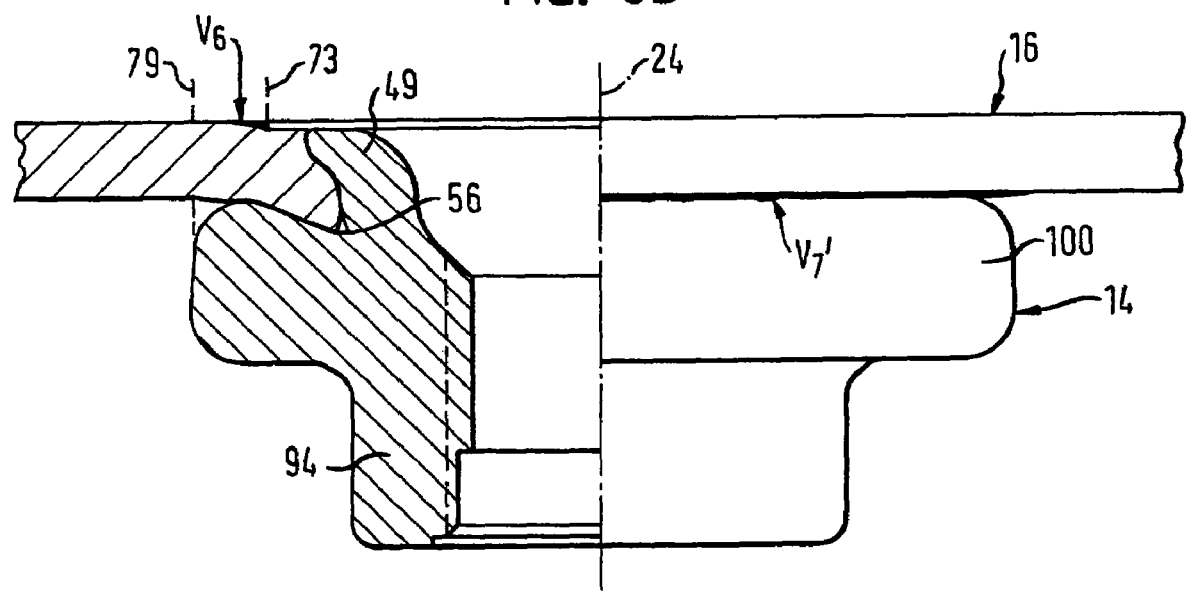

One possibility of holding the functional element 14 fully in the recess 20, i.e. so that the lower end face 28 of the body section 30 of the functional element 14 in FIG. 1A comes into contact at the lower boundary 32 of the recess 20, consists in providing one or two magnets 34 within the central bore 36 or within the thread cylinder 38 of the functional element or beneath the functional element (FIG. 7A). The magnet 34 or the magnets (see for example also FIG. 7A) can be held via a respective shaft part of a device (not shown) which is movable to and fro in the axial direction 26 of the setting head. In order to bring the sheet metal part 16 into contact with the end face 18 of the setting head 10, when the arrangement is not so designed that gravity satisfies this task, a hold-down member 44 can be used. As illustrated in FIG. 1A the hold-down member 44 which is disposed concentrically to the die button 12 is resiliently mounted in the direction of the setting head and stands in front of the end face of the die button 12. On closing of the press, or on utilization of the device of the robot which produces the force, the hold-down member 44 deflects rearwardly until the end face 40 of the die button 12 comes into contact at the upper side 42 of the sheet metal part 16 in FIG. 1A. A spring biased hold-down member 44 of this kind is drawn in in FIG. 1A and could also be used in all the other embodiments.

A hold-down member 44 of this kind could also be used when, for example, the setting head 10 of FIG. 1A is arranged at the top and the die button 12 is arranged at the bottom. The sheet metal part is then laid onto the free end face 46 of the hold-down member (with this end face 46 then pointing upwardly) and the sheet metal part is thus placed during closing of the press over the tubular rivet section 48 of the functional element 14 so that the hole 50 receives the tubular rivet section 48, as is shown in FIG. 1A. Also a robot could be used in order to bring the sheet metal part into contact against the end face of the setting head which points downwardly in this example and to bring it over the then downwardly directed rivet section of the functional element. For the present invention it is of importance that the rivet section 48 has already been fully introduced into the hole 50 by the amount which is respectively determined by the axial depth of the recess 20 of the setting head before the rivet bead is formed by means of the die button 12.

The functional element of FIG. 1A is an RSN element of the company Profil Verbindungstechnik GmbH & Co. KG in which the jacket surface 52 of the body section 30 merges via a ring-like contact surface 54 arranged in a plane perpendicular to the longitudinal axis 24 of the functional element into the tubular rivet section 48. In this example the functional element 14 has eight noses 56 providing security against rotation which are uniformly angularly distributed about the longitudinal axis, which are provided in raised form on the ring-like contact surface 54 and on the rivet section 48 and which have an approximately rectangular shape. As indicated at 58 these noses 56 providing security against rotation have in general a rounded outer surface so that they can indeed be pressed into the sheet metal part but do not however impermissibly damage it. The number of noses 56 providing security against rotation, or features providing security against rotation, is not necessarily 8. In principle, any desired number of noses providing security against rotation can be provided, with a number between 6 and 18 being usual.

One can see from FIG. 1A that the ring-like contact surface 54 is set back from the free end face 18 of the setting head 10 by choice of the axial depth of the recess 20, with the cylindrical wall of the recess 20 merging via a chamfer or bevel 60 into the free end face of the setting head.

The functional element 14 is thus arranged recessed within the setting head 10.

On closing of the press the end face 46 of the hold-down member 44 (if provided) engages onto the sheet metal part 16 and presses this firmly against the free end face 18 of the setting head or against a support surface 62 of a tool which is arranged around the setting head 10. A support surface such as 62 in FIG. 1 can, if required, also be provided in all other embodiment. However, it is not shown in the other embodiments for the sake of simplicity. The hold-down member 44 ensures that the lower side 64 of the sheet metal part contacts the free end face 18 of the setting head, and indeed with the tubular rivet section 48 already being positioned in the hole 50 before the die button 12 starts to deform the tubular rivet section 48 of the functional element. On increasing closing of the press the hold-down member 44 deflects rearwardly against the force of the springs 66 that are provided until the central post 64 of the die button penetrates into the tubular rivet section 48 of the functional element 14. During this penetrating movement the central post 64 starts to dilate the rivet section 48 radially outwardly and to turn it over. One notes that the central post 64 of the die button 12 merges via a ring-like concavely rounded surface 68 into a ring step 70 which projects by about 0.2 mm from the end face 40 of the die button. The broken line 72 indicates the position of the rounded surface 68 which is aligned with the cylindrical inner surface 74 of the tubular rivet section 48. The broken line 73 shows the point at which the ring step 70 merges via a ring shoulder into the end face 40 of the die button 12.

With increasing movement of the die button 12 towards the sheet metal part 16 and the setting head 10 the inner surface 74 of the tubular rivet section 48 or the conical surface 76 enters into contact with the rounded surface 68 and the latter drives the rivet section 48 increasingly radially outwardly in the region of its free end, so that the rivet section, starting from the shape in FIG. 1, adopts an upwardly divergent conical shape and the so-formed conical outer wall of the tubular rivet section 48 moves onto the rim of the hole 50 in the sheet metal part and subsequently drives the rim of the hole in FIG. 1A downwardly in direction towards the ring-like contact surface 54. Because the engagement between the rivet bead that has been formed in the rim of the hole 50 takes place in conical manner the sheet metal part is bent downwardly in the area of the recess 20 of the setting head. With a further progressing movement of the die button 12 towards the sheet metal part 16, i.e. towards the setting head 10, the rivet section 48 is subsequently driven along the step 70 around the central post of the die button until the state of FIG. 2A is reached which corresponds to the finished component assembly after full closing of the press or of the robot. One can see from FIG. 2A that the upper side 80 of the rivet bead 49 lies fractionally below the upper side 42 of the sheet metal part 16 and indeed by an amount in the range between 0.0 and 0.2 mm which corresponds to the axial height of the step 70.

One notes also from FIG. 2A that the sheet metal part fully fills out of the space between the rivet bead 49 and the ring-like contact surface 54 of the functional element 14 and this signifies that in this embodiment also a considerable stranglehold has arisen between the deformed sheet metal part 16 and the rivet bead 49, in particular in the region between the rivet bead 49 and the ring-like contact surface 54, although the arrangement was selected so that in the starting phase the hole 50 in the sheet metal part had a not inconsiderable spacing from the tubular or cylindrical rivet section 48.

The noses 56 providing security against rotation are driven by the attachment of the functional element to the sheet metal part 16 into the sheet metal part and form, together with the said stranglehold, a considerable security against rotation between the functional element 14 and the sheet metal part 16. Since the sheet metal part 16 is firmly clamped in the region of the edge of the hole between the rivet bead 49 and the ring-like contact surface 54 the rounded noses 56 providing security against rotation can also not move out of the grooves they have themselves formed in the sheet metal part, even on the application of considerable torques to the functional element 14.

In order to ensure this firm attachment of the functional element to the sheet metal part it is appropriate to preset various volumes taking account of the respective thickness of the sheet metal part.

These are the volumes $V_1$ to $V_7$ which are shown in FIGS. 1B, 1C, 1D and 2B. These volumes will now be explained in more detail:

$V_1$ is the volume of the free space of the said recess 20 in the setting head 10 around the tubular rivet section 48 between the ring-like end face 18 of the setting head which contacts the sheet metal part 16 and the plane of the sheet metal contact surface 54 of the functional element. The volume $V_2$ is ring-shaped and is entered with a black half cross-section only on the right hand side of FIG. 1C in order not to make the representation of $V_2$ on the left hand side of FIG. 1C more difficult.

$V_2$ is the volume of the free space provided between the edge of the hole in the sheet metal part and the tubular rivet section. This volume is also ring-like and is only shown in black half cross-section in FIG. 1C.

$V_3$ is the volume of the total features 56 providing security against rotation with a positive sign when the features providing security against rotation have the form of raised features, as 56, and with a negative sign if the features providing security against rotation were formed by recesses (not shown).

$V_4$ is the volume of the region of the tubular riveting section which projects beyond the side of the sheet metal part remote from the setting head. The volume $V_4$ is ring-like and is only shown in a black half cross-section in FIG. 1D.

$V_5$ is the volume of the central post 64 of the die button which projects beyond the end face of the die button 12 which lies opposite to the ring-like end face 18 of the setting head and is located radially outside of a circularly cylindrical region of the central post with a diameter which corresponds to the internal diameter of the tubular rivet section, as made clear by the position of the broken line 72. The line 73 represents the outer boundary of the volume $V_5$, i.e. the point on the diameter of the step 70 where the step 70 merges via a ring shoulder into the end face 40. Here the volume $V_5$ is again ring-like and only shown in black half cross-section.

$V_6$ is the volume of any free space which is present at the rivet bead side of the finished component assembly which lies beneath the plane of the sheet metal which is defined by the side of the sheet metal part remote from the body section and radially outside and if present beneath the recess in the rivet bead determined by V5. The volume V6 is likewise ring-like and shown in black half cross-section. It extends between an inner diameter corresponding to the position 73 and an outer diameter corresponding to the position 79 where the recess in the sheet metal part ends, i.e. runs out into the plane of the top side 42 of the sheet metal.

V7 is the volume of a ring-like region which is present at the side of the sheet metal part confronting the body part of the functional element 14 radially within the jacket surface 52 of the body section between the latter and the side of the sheet metal part facing it and formed by the bending of the sheet metal at a chamfer or bevel or at a said rounded transition of the recess. The volume $V_7$, which is likewise shown in black half cross-section is thus approximately triangular and is bounded at the side of the hypotenuse by the sheet metal part at the lower side by the plane of the ring-like contact surface 54 and at the radially outer side by the imaginary continuation 81 of the cylindrical jacket surface 52.

The design is preferably such that $V_1+V_2-V_3-V_4-V_5-V_6-V_7$ is equal to zero or is eventually fractionally smaller than zero in order to ensure that the space between the rivet bead and the ring-like contact surface is fully filled with sheet metal material. The so arising excess of material can be received partly in compression of the sheet metal material or of the material of the element and can also partly represent a slight elevation of the sheet metal material directly outside of the functional element. One can see that with a thin sheet metal part in accordance with FIG. 1A, with a sheet metal part of 0.75 mm thickness for example, the functional element 14 is arranged recessed by an amount of approximately 1.5 mm within the recess 20 of the setting head.

With a thick sheet metal, for example with a thickness of 2 mm the position is similar for the same RSN element. Here the contact surface 54 of the functional element 14 is however arranged recessed within the contact surface 54 of the functional element 14 by an amount of about 0.5 mm (taking account of the enlarged representation of FIG. 3). The method in accordance with the invention can however also be used with thicker metal sheets of 3 to 4 mm. Depending on the specific design of the elements one can succeed in using one element for a large range of sheet metal thicknesses of, for example, 0.6 mm to 3.5 mm or indeed up to 4,0 mm. It can however also be necessary to provide two elements with different rivet sections in order to cover such a range of sheet metal thicknesses. This can above all be necessary with a functional element of the RND type.

Figure 3B:
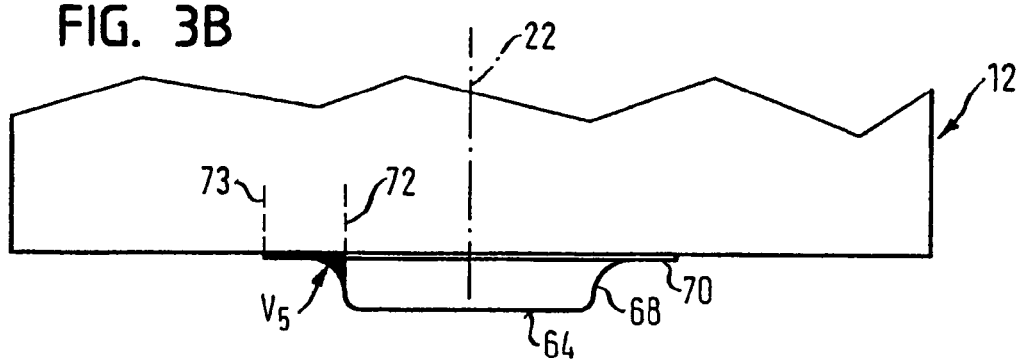

The volume $V_5$ in accordance with FIG. 3B corresponds to the volume $V_5$ in accordance with FIG. 1B.

Figure 3C:
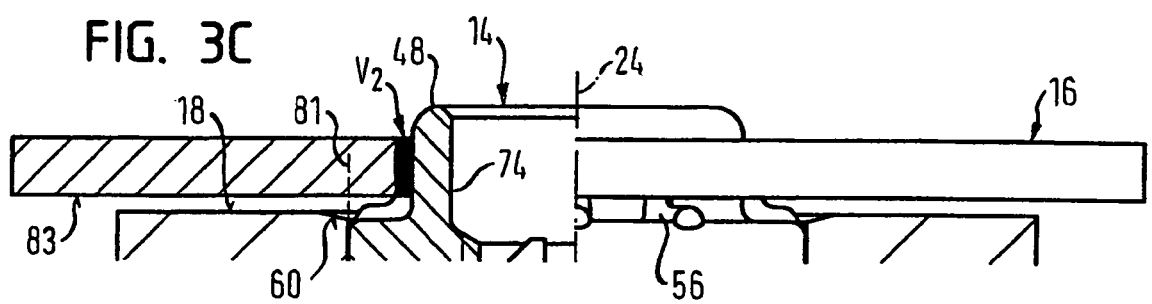
Figure 3D:
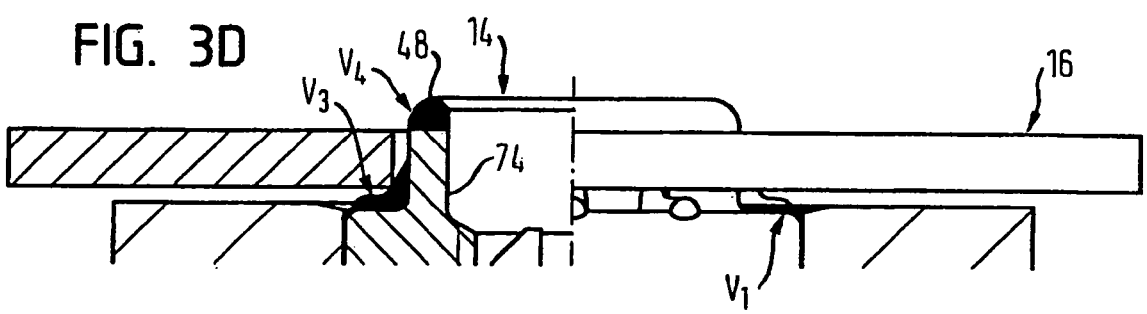

In contrast the volume V2 in accordance with FIG. 3C is significantly larger than the volume V2 of FIG. 1C, since the sheet metal thickness is substantially larger than in FIG. 1C. The volume V1 in accordance with FIG. 3C corresponds to the volume V1 of FIG. 1C but is smaller than in FIG. 1C because the sheet metal part 16 is first spaced from the end face 18 of the setting head since the lower edge of the hole sits on the noses 56 providing security against rotation. This also applies for the volume V3 of the ribs providing security against rotation (volume of a single rib providing security against rotation times the number of the ribs providing security against rotation) which signifies that the same element can be used both with thin metal sheets and also with thick metal sheets. The volume V4 is smaller than shown in FIG. 1D, although the element sits higher in the setting head, because the sheet metal thickness in the embodiment of FIG. 3A is larger than in the embodiment of FIG. 1.

Figure 4A:
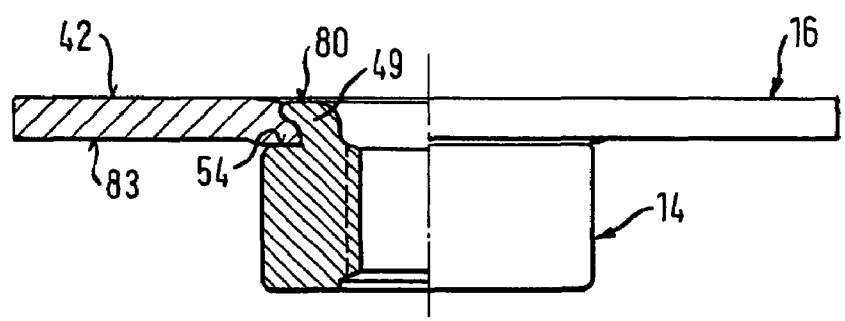
Figure 4B:
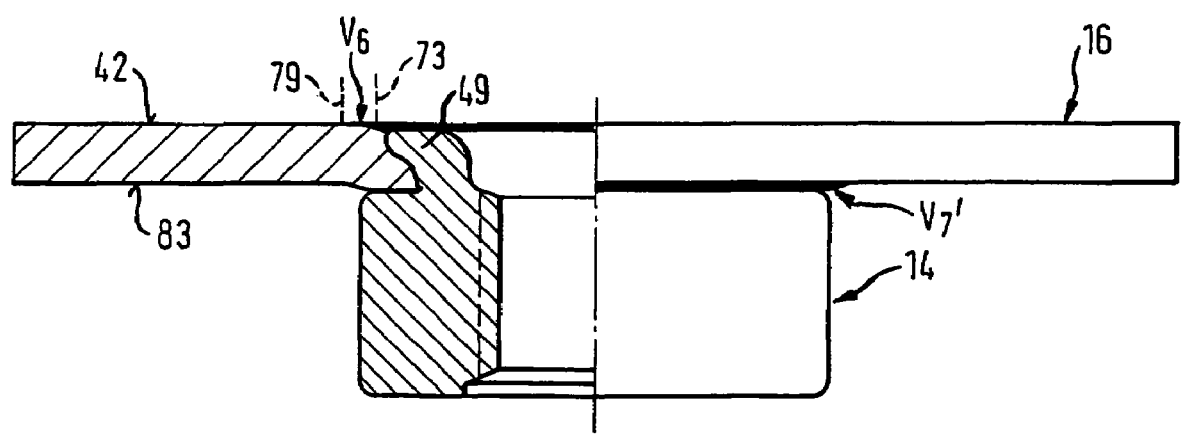
Figure 5A:
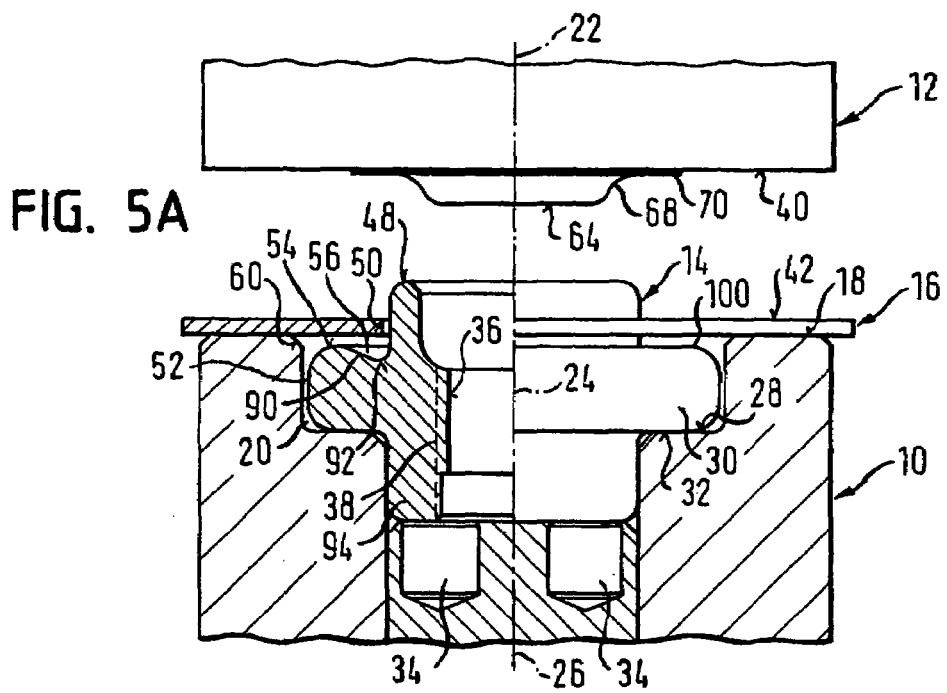
Figure 5B:
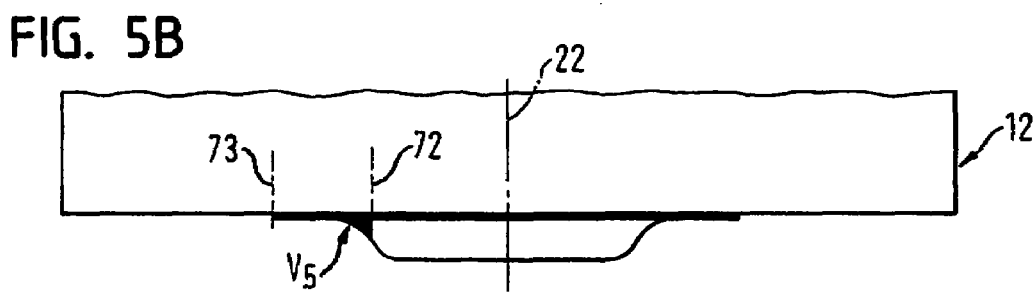
Figure 5C:
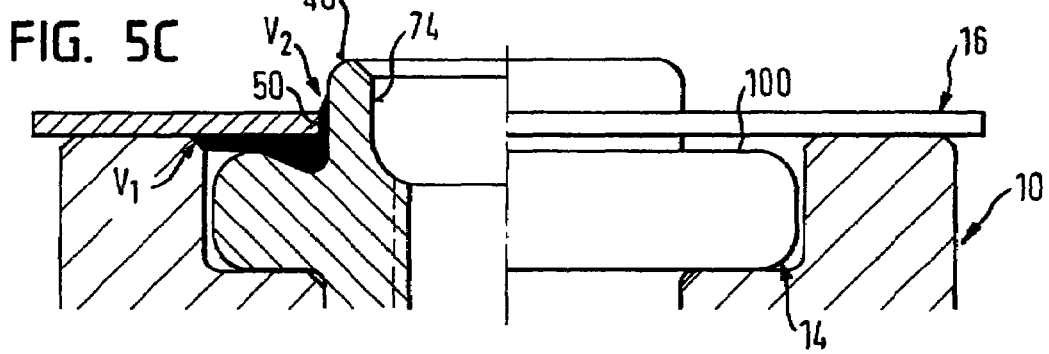
Figure 5D:
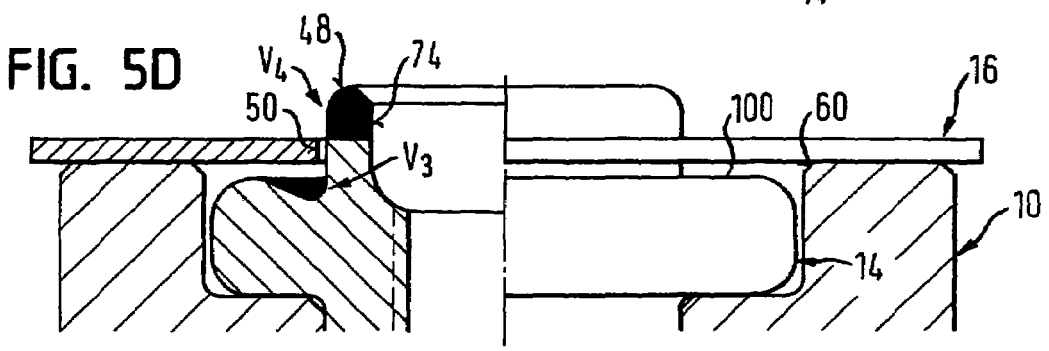
Figure 6A:
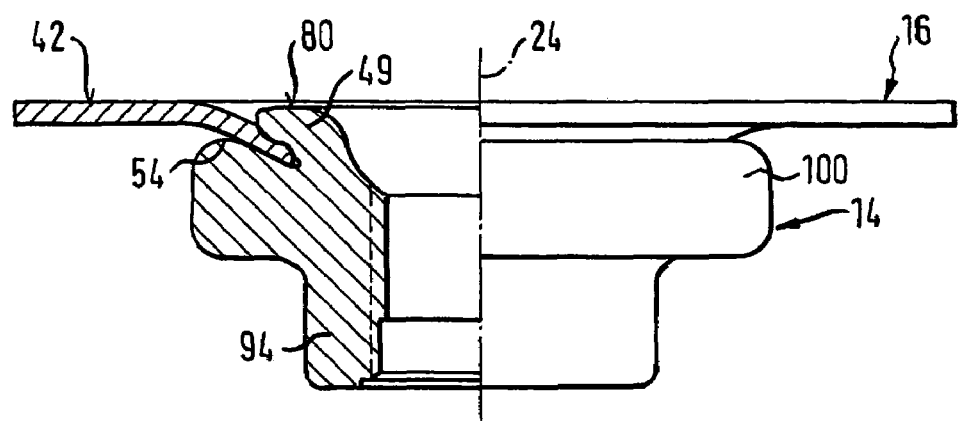
Figure 6B:
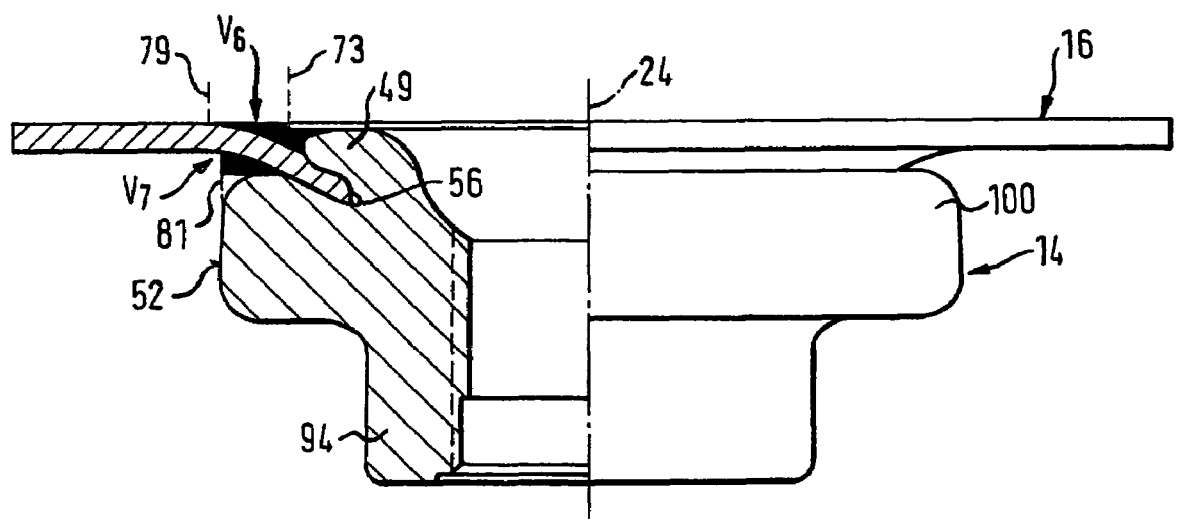

The component assembly which arises on closing of the press or on movement of the die button towards the setting head is shown in FIGS. 4A and 4B.

One can see from this representation that the volume V6 is significantly smaller than the corresponding volume $V_6$ in the representation of FIG. 2B. In the embodiment of FIGS. 3 and 4 the volume $V_7'$ is determined by the ring of sheet material which lies below the lower side of the sheet metal in the undeformed region of the sheet metal part 16 and extends around the rivet bead. Since this volume provides additional take-up capacity for the rivet bead it enters here with a positive sign into the equation and therefore $$V_1+V_2-V_3-V_4-V_5-V_6+V_7'\leq 0$$

applies. Here also an extremely firm attachment of the RSN element 12 to the sheet metal part is achieved.

FIGS. 5 to 8 now show how the method of the invention can be used with an RND element, with FIGS. 5A to 5D and 6A, 6B being concerned with the attachment of an RND element to a thin sheet metal part, whereas the FIGS. 7A to 7D, 8A and 8B are concerned with the attachment of the same elements to a thicker sheet metal part.

The reference numerals used in FIGS. 5 to 8 are the same as for the embodiments of FIGS. 1 to 4, so that the previous given description also applies for the corresponding parts and features in the embodiments of FIGS. 5 to 8 and here only those features or measures are described which are distinguished from the previous embodiments of FIGS. 1 to 4. All alternatives described in conjunction with the embodiments of FIGS. 1 to 4 also apply precisely in the same manner for the embodiments of FIGS. 5 to 8, for example the possible attachment of the setting head and the die button in a press or the movement of these parts towards one another and away from one another using a robot or a C-frame, the use of magnets, in order to hold the functional element in the setting head or the sheet metal part to the setting head and the use of a robot in order to position the sheet metal part 16 over the setting head so that the rivet section 46 projects through the hole in the sheet metal part. Here also the pierced hole 50 is a smoothly pierced hole so that the sheet metal part 16 forms, prior to the attachment of a functional element, in each case a continuous plane in the area of the end face 18 of the setting head.

The important differences between the RND element of FIGS. 5 to 8 and the previously described RSN element lies in the fact that a ring-like axial groove of approximately V-shape in half cross-section is provided inside the ring-like contact surface 54 of the functional element which lies in a plane perpendicular to the central longitudinal axis 24 of the element, with the axial groove running via a rounded ring-like transition 92 into the tubular rivet section 48 of the functional element 14. The ribs 46 providing security against rotation have in side-view the cross-sectional shape of the groove, which is why they can be said to bridge the groove. They extend, so to say from the ring-like contact surface up to the tubular rivet section 48. They lie with their topside in the plane of the ring-like contact surface could however also lie fractionally below it. Furthermore, in this example, the fastening section of the fastener element, i.e. the thread cylinder 38 lies opposite to the tubular rivet section, i.e. the thread cylinder 38 lies beneath the ring-like contact surface 54 and extends in FIG. 6A further downwardly within a cylindrical part 94 which stands proud of the lower side of the flange 100.

The ring-like surface of the V-shaped axial groove 90 also belongs to the contact surface of the element. The element is held in a setting head in this example by two magnets 34 which engage in FIG. 5 at the lower end of the cylinder section 94 of the functional element 14.

Since the axial groove is provided in this embodiment the volume $V_1$ is formed by two part volumes with a thick sheet metal, where the axial depth of the recess 20 is so selected that the ring-like sheet metal contact surface 54 lies in the plane of the end face 18 of the setting head—as shown in FIG. 7—with the two part volumes being provided radially inside and outside the ring-like contact surface 54. Otherwise the volumes $V_1$ to $V_7$ correspond to the volumes $V_1$–$V_7$ which were previously described in connection with the embodiments of FIGS. 1 to 4. Here the volume $V_3$ of the ribs providing security against rotation is given by the number of ribs, which can for example be between 6 and 12 in number and the volume of the individual ribs. Here also one element can be used with various sheet metal thicknesses, for example in the range between 0.75 and 3 mm or 0.75 and 4 mm.

With thicker sheet metals it is ultimately permissible, as also with the RSN element, if a small volume is left in the form of ring-like hollow cavity which is not filled by material of the sheet metal part, in the region of the edge of the hole 50 after the attachment of the functional element to the sheet metal part. This is, for example, permissible because a considerable axial range of the sheet material is present which is pressed radially onto the rivet bead and thus ensures a pronounced stranglehold here.

Finally it should be pointed out that for the sheet metal all the steel or aluminium or magnesium sheet metal parts can be considered which have deep drawing qualities, whereas a somewhat stronger material should be used for the functional element.

In all embodiments all materials can be named as an example for the material of the functional elements which in a context of cold deformation exceed the strength values of class 8 in accordance with the ISO standard, for example a 35B2-alloy in accordance with DIN 1654. The so formed fastener elements are suitable amongst other things for all, commercially available steel materials for drawing quality sheet metal parts and also aluminium or its alloys. Aluminium alloys, in particular those with higher strength can be used for the functional element, for example AlMg5. Functional elements of higher strength magnesium alloys such as for example AM50 can also be considered.

What is claimed is:

1. In a method for the attachment of a functional element to a sheet metal part to form a final assembly component, wherein the functional element has an at least substantially non-deformable body section of a larger diameter which merges via a ring-like contact surface into a deformable tubular rivet section of a smaller diameter and also has rib-like features providing security against rotation which are present in raised form in the region of the contact surface and/or at the outer side of the rivet section, a method comprising:

pre-holing the sheet metal part to form a right cylindrical hole to receive the rivet section;

introducing the rivet section in the hole;

reshaping the rivet section radially outwardly to form a rivet bead by means of a riveting die button having a raised portion at its end face confronting the sheet metal;

wherein the hole in the sheet metal part is so formed that the sheet metal part lies in one plane in the region confronting the end face of the riveting die button and at least substantially does not project beyond this plane, wherein the hole in the sheet metal part is formed with an inner diameter which is larger by an amount in the range from 0.8 mm to 1.2 mm than an outer diameter of the rivet section, ignoring features present thereon providing security against rotation, whereby a marginal region of the hole is deformed by the action of the riveting die button out of the sheet metal plane and in the direction of the body section of the functional element before the marginal region of the hole enters into contact with the riveting section as a result of the formation of the rivet bead and does not prevent either a bending of the marginal region of the hole out of the sheet metal plane or the formation of the rivet bead and wherein the functional element is placed, for the carrying out of the method, in a recess of a setting head having a free end face so that said contact surface of the functional element does not project at least substantially beyond the free end face of the setting head confronting the sheet metal part and is as a rule set back from this end face.

2. In a method in accordance with claim 1, wherein the hole of the sheet metal part is formed as a smoothly apertured punched hole.

3. In a method in accordance with claim 1, wherein the inner diameter of the hole exceeds the outer diameter of the riveting section by 1.0 mm.

4. In a method in accordance with claim 1, wherein for a functional element in a size below M6 the amount lies in the range of 0.8 mm, for a functional element in the size M8, the amount is approximately 1.00 mm and for a functional element of a size of M10 or larger, the amount is approximately 1.2 mm, independently of the thickness of the sheet metal part.

5. In a method in accordance with claim 1, wherein an end face of the setting head has, in a region where the recess transitions into this end face and around the functional element a chamfer or a rounded transition.

6. In a method in accordance with claim 1, wherein the following sum of the volumes $V_1$–$V_7$ is at least substantially equal to zero:

$$V_1 + V_2 - V_3 - V_4 - V_5 - V_6 - V_7 = 0, \text{ wherein:}$$

$V_1$ is the volume of the free space of the recess in the setting head around the tubular rivet section between the ring-like end face of the setting head which contacts the sheet metal part and the sheet metal contact surface of the functional element, $V_2$ is the volume of the free space provided between the edge of the hole in the sheet metal part and the tubular rivet section, $V_3$ is the volume of the features providing security against rotation that are provided with a positive sign when the features providing security against rotation are in a raised form and with a negative sign when the features providing security against rotation are formed by recesses, $V_4$ is the volume of the region of the tubular riveting section which projects beyond the side of the sheet metal part remote from the setting head, $V_5$ is the volume of a central post of the die button forming the raised portion which projects beyond the end face of the riveting die button, which lies opposite to the end face of the setting head and which is located radially outside of a circularly cylindrical region of the central post with a diameter which corresponds to the inner diameter of the tubular rivet section, $V_6$ is the volume of any free space that is provided at the rivet bead side of the finished component assembly which lies below the plane of the sheet metal defined by a side of the sheet metal part remote from the body section and which lies radially outside of a recess in the rivet bead determined by $V_5$, and $V_7$ is the volume of any ring-like region which is present at the side of the sheet metal part facing the body part of the functional element radially inside a jacket surface of the body portion between the jacket surface of the body portion and the side of the sheet metal part confronting it and is formed by a chamfer or by a rounded transition of the recess.

7. In a method in accordance with claim 1, wherein the following sum of the volumes $V_1$–$V_7$ is at least substantially equal to zero:

$$V_1+V_2-V_3-V_4-V_5-V_6+V_7=0, \text{ wherein:}$$

$V_1$ is the volume of the free space of the recess in the setting head around the tubular rivet section between the ring-like end face of the setting head which contacts the sheet metal part and the sheet metal contact surface of the functional element, $V_2$ is the volume of the free space provided between the edge of the hole in the sheet metal part and the tubular rivet section, $V_3$ is the volume of the features providing security against rotation that are provided with a positive sign when the features providing security against rotation are in a raised form and with a negative sign when the features providing security against rotation are formed by recesses, $V_4$ is the volume of the region of the tubular riveting section which projects beyond the side of the sheet metal part remote from the setting head, $V_5$ is the volume of a central post of the die button forming the raised portion which projects beyond the end face of the riveting die button, which lies opposite to the end face of the setting head and which is located radially outside of a circularly cylindrical region of the central post with a diameter which corresponds to the inner diameter of the tubular rivet section, $V_6$ is the volume of any free space that is provided at the rivet bead side of the finished component assembly which lies below the plane of the sheet metal defined by a side of the sheet metal part remote from the body section and which lies radially outside of a recess in the rivet bead determined by $V_5$, and $V_7$ is the volume which is determined by the ring of sheet metal material which lies beneath an underside of the sheet metal in an undeformed region of the sheet metal part and extends around the rivet section.

8. In a method in accordance with claim 1, wherein the method is carried out such that in a riveted state at least substantially no free space is present between a region of the sheet metal part clamped between the body section and the riveting bead and the body section or the rivet bead, respectively.

9. In a method in accordance with claim 1, wherein the method is carried out so that in a riveted state the rivet bead lies at the maximum in the plane of a side of the sheet metal part remote from the body section.

10. In a method in accordance with claim 1, wherein an axial amount of recessing of the contact surface of the functional element from a free end face of the setting head and dimensions of any eventually present chamfer or rounded feature at a transition from the recess into this free end face is selected in accordance with thickness of the sheet metal part and shaping of the body section of the functional element, with the amount of recessing if any being, larger with thin metal parts and smaller with thicker sheet metal parts.

11. In a method in accordance with claim 1, wherein the method is carried out such that in the finished component assembly consisting of the sheet metal part and the functional element a recessing of the rivet bead back from a side of the sheet metal part remote from the body section lies, in accordance with an axial height of the recess of the die button, in the range between 0 and 0.02 mm.

12. In a method in accordance with claim 1, wherein the body section of the functional element used merges into the rivet section via a ring-like contact surface disposed in a plane perpendicular to the functional element's longitudinal.

13. In a method in accordance with claim 12, wherein the functional element is an RSN element wherein ribs providing security against rotation are provided in raised form at the contact surface and at the rivet section and have an approximately right-angled shape.

14. In a method in accordance with claim 1, wherein the functional element is an RND element wherein the body section of the functional element merges via a ring-like contact surface disposed in a plane perpendicular to the functional element's longitudinal axis into an axial ring-like groove which is restricted at its radially inner side by the tubular rivet section, wherein the ring-like groove has a conical wall adjacent to the ring-like contact surface and is bridged by radially extending ribs providing security against rotation.

15. In a method in accordance with claim 1, wherein the riveting die button has a projecting central post which is circular in plan view and merges via a concave ring shoulder into the end face of the die button.

16. In a method in accordance with claim 15, wherein the concave ring shoulder merges into a small ring-like step which then merges via a small step with a height smaller than or equal to 0.02 mm into the end face of the die button.

17. In a method in accordance with claim 1, wherein the setting head is arranged so that the tubular rivet section of the functional element projects upwardly, the pre-holed sheet metal part is arranged over an upwardly projecting rivet section of the functional element and the die button is provided at a side of the sheet metal part remote from the setting head and is moved towards the setting head by a relative movement with respect thereto in order to carry out the riveting process.

18. In a method in accordance with claim 1, wherein the sheet metal part is fully placed over the tubular rivet section before the die button is moved towards the tubular section to carry out the riveting process.

19. In a method in accordance with claim 1, wherein magnets are used in order to hold the sheet metal part in contact with the free end face of the setting head.

20. In a method in accordance with claim 1, wherein at least one magnet is used in order to hold the functional element in the recess of the setting head.

21. In a method for the attachment of a functional element to a sheet metal part, wherein the functional element has a body section of a larger diameter which merges via a ring-like contact surface into a deformable tubular rivet section of a smaller diameter and also has rib-like features providing security against rotation which are present in raised form in the contact surface region and/or at the rivet section's outer side, a method comprising pre-holing the sheet metal part to form a right cylindrical hole to receive the rivet section;

introducing the rivet section into the hole;

reshaping the rivet section radially outwardly to form a rivet bead by means of a riveting die button having a raised portion at its end face confronting the sheet metal part;

wherein the hole is so formed in the sheet metal part that the sheet metal part lies in one plane in a region confronting the end face of the riveting die button and at least substantially does not project beyond this plane, wherein the hole in the sheet metal part has an inner diameter which is larger than the riveting section's outer diameter, ignoring any features present there providing security against rotation, by an amount in the range between 0.8 and 1.2 mm.

* * * * *